(12) United States Patent
Ivers et al.

(10) Patent No.: US 8,799,064 B2
(45) Date of Patent: Aug. 5, 2014

(54) SYSTEM FOR CROSS-INTEGRATION OF CONSUMER LOYALTY PROGRAMS AND METHODS THEREOF

(75) Inventors: Morley Ivers, Brooklyn, NY (US); Ron Gonen, New York, NY (US)

(73) Assignee: Recyclebank, LLC, New York, NY (US)

( * ) Notice: Subject to any disclaimer, the term of this patent is extended or adjusted under 35 U.S.C. 154(b) by 566 days.

(21) Appl. No.: 12/686,873

(22) Filed: Jan. 13, 2010

(65) Prior Publication Data

US 2010/0241489 A1    Sep. 23, 2010

Related U.S. Application Data

(60) Provisional application No. 61/162,093, filed on Mar. 20, 2009.

(51) Int. Cl.
*G06Q 30/00* (2012.01)

(52) U.S. Cl.
USPC ...................................................... 705/14.11

(58) Field of Classification Search
USPC ............................................................ 705/14
See application file for complete search history.

(56) References Cited

U.S. PATENT DOCUMENTS

| | | | |
|---|---|---|---|
| 4,248,334 A | 2/1981 | Hanley et al. |
| 4,949,528 A | 8/1990 | Palik |
| 5,035,564 A | 7/1991 | Matsumoto |
| 5,072,833 A | 12/1991 | Hansen et al. |
| 5,209,312 A | 5/1993 | Jensen |
| 5,209,361 A | 5/1993 | Grubb, Jr. |
| 5,230,393 A | 7/1993 | Mezey |
| 5,251,761 A | 10/1993 | Hansen et al. |
| 5,304,744 A | 4/1994 | Jensen |
| 5,333,984 A | 8/1994 | Bayne et al. |
| 5,355,987 A | 10/1994 | DeWoolfson et al. |
| 5,416,279 A | 5/1995 | Tseng |
| 5,425,456 A | 6/1995 | Erikson |

(Continued)

FOREIGN PATENT DOCUMENTS

| | | |
|---|---|---|
| JP | 2001-312551 | 9/2001 |
| JP | 2002-073896 A2 | 3/2002 |

(Continued)

OTHER PUBLICATIONS

International Preliminary Report on Patentabillity, PCT Application PCT/US2010/025993, Recyclebank, LLC et al. dated Sep. 20, 2011, 7 pages.

(Continued)

*Primary Examiner* — Matthew L Hamilton
(74) *Attorney, Agent, or Firm* — Maldjian Law Group LLC; John Maldjian

(57) ABSTRACT

Embodiments of the present invention relate to a system for cross-integrating consumer data from separate consumer loyalty programs to create an aggregated consumer record and methods thereof. In one embodiment of the present invention, a method for cross-integrating consumer loyalty programs comprises obtaining a first set of consumer data on a consumer from a first reward partner, obtaining a second set of consumer data from the consumer, aggregating the first set of consumer data and the second set of consumer data in a database, creating an aggregated consumer record in the database from the aggregated data, and providing access to the aggregated consumer record to the first reward partner.

13 Claims, 11 Drawing Sheets

(56) References Cited

U.S. PATENT DOCUMENTS

| | | | |
|---|---|---|---|
| 5,447,017 | A | 9/1995 | Becher et al. |
| 5,484,246 | A | 1/1996 | Horning et al. |
| 5,628,412 | A | 5/1997 | Hulls |
| 5,699,525 | A | 12/1997 | Embutsu et al. |
| 5,704,558 | A | 1/1998 | Arrott |
| 5,712,990 | A | 1/1998 | Henderson |
| 5,833,429 | A | 11/1998 | McNeilus et al. |
| 5,837,945 | A | 11/1998 | Cornwell et al. |
| 5,842,652 | A | 12/1998 | Warsing et al. |
| 5,871,114 | A | 2/1999 | Anderson et al. |
| 5,923,016 | A | 7/1999 | Fredregill et al. |
| 5,934,867 | A | 8/1999 | Christenson |
| 5,960,402 | A | 9/1999 | Embutsu et al. |
| 5,965,858 | A | 10/1999 | Suzuki et al. |
| 5,983,198 | A | 11/1999 | Mowery et al. |
| 6,026,370 | A | 2/2000 | Jermyn |
| 6,055,573 | A | 4/2000 | Gardenswartz et al. |
| 6,292,785 | B1 | 9/2001 | McEvoy et al. |
| 6,448,898 | B1 | 9/2002 | Kasik |
| 6,496,804 | B2 | 12/2002 | McEvoy et al. |
| 6,663,004 | B2 | 12/2003 | Wagner et al. |
| 6,664,897 | B2 | 12/2003 | Pape et al. |
| 6,718,343 | B2 | 4/2004 | Kamata |
| 6,952,625 | B2 | 10/2005 | Uetake et al. |
| 6,993,712 | B2 | 1/2006 | Ramachandran et al. |
| 7,032,820 | B2 | 4/2006 | Kreiner et al. |
| 7,133,895 | B1 | 11/2006 | Lee et al. |
| 7,134,084 | B1 | 11/2006 | Rashid et al. |
| 7,136,865 | B1 | 11/2006 | Ra et al. |
| 7,167,836 | B2 | 1/2007 | Gottselig et al. |
| 7,251,620 | B2 | 7/2007 | Walker et al. |
| 7,267,262 | B1 | 9/2007 | Brown |
| 7,313,602 | B2 | 12/2007 | Ono et al. |
| 7,398,225 | B2 | 7/2008 | Voltmer et al. |
| 7,398,226 | B2 | 7/2008 | Haines et al. |
| 7,398,248 | B2 | 7/2008 | Phillips et al. |
| 7,424,441 | B2 | 9/2008 | George et al. |
| 7,428,498 | B2 | 9/2008 | Voltmer et al. |
| 7,496,524 | B2 | 2/2009 | Voltmer et al. |
| 7,689,682 | B1 * | 3/2010 | Eldering et al. ............ 709/223 |
| 7,999,688 | B2 | 8/2011 | Healey et al. |
| 2002/0026326 | A1 | 2/2002 | Stevens |
| 2002/0082920 | A1 | 6/2002 | Austin et al. |
| 2002/0188509 | A1 | 12/2002 | Ariff et al. |
| 2003/0055723 | A1 * | 3/2003 | English ........................ 705/14 |
| 2003/0065610 | A1 | 4/2003 | Brown et al. |
| 2003/0115097 | A1 | 6/2003 | Sokei et al. |
| 2003/0139981 | A1 | 7/2003 | Mizuno et al. |
| 2003/0158818 | A1 | 8/2003 | George et al. |
| 2003/0233278 | A1 | 12/2003 | Marshall |
| 2004/0167799 | A1 | 8/2004 | Berry |
| 2004/0199401 | A1 | 10/2004 | Wagner et al. |
| 2004/0199545 | A1 | 10/2004 | Wagner et al. |
| 2004/0200689 | A1 | 10/2004 | Compton et al. |
| 2004/0243468 | A1 | 12/2004 | Cohagan et al. |
| 2005/0027597 | A1 * | 2/2005 | Peterson ....................... 705/14 |
| 2005/0038572 | A1 | 2/2005 | Krupowicz |
| 2005/0043963 | A1 | 2/2005 | Soga et al. |
| 2005/0059849 | A1 | 3/2005 | Liu |
| 2005/0080520 | A1 | 4/2005 | Kline et al. |
| 2005/0131757 | A1 | 6/2005 | Chan et al. |
| 2005/0192963 | A1 | 9/2005 | Tschiegg et al. |
| 2005/0256767 | A1 | 11/2005 | Friedman |
| 2005/0273340 | A1 | 12/2005 | Yamamoto |
| 2006/0069588 | A1 | 3/2006 | Ritter |
| 2006/0080819 | A1 | 4/2006 | McAllister |
| 2006/0178933 | A1 | 8/2006 | FitzGerald et al. |
| 2006/0224450 | A1 | 10/2006 | Moon |
| 2006/0253407 | A1 | 11/2006 | Waddell et al. |
| 2006/0273180 | A1 | 12/2006 | Ammond et al. |
| 2007/0100694 | A1 | 5/2007 | Kopps |
| 2007/0102506 | A1 | 5/2007 | Stevens |
| 2007/0112632 | A1 | 5/2007 | Voltmer et al. |
| 2007/0174073 | A1 | 7/2007 | Hunscher et al. |
| 2007/0219862 | A1 | 9/2007 | Casella et al. |
| 2007/0260466 | A1 | 11/2007 | Casella et al. |
| 2008/0061124 | A1 | 3/2008 | Langlois et al. |
| 2008/0061125 | A1 | 3/2008 | Langlois et al. |
| 2008/0069641 | A1 | 3/2008 | Kreiner et al. |
| 2008/0077498 | A1 | 3/2008 | Ariff et al. |
| 2008/0077499 | A1 | 3/2008 | Ariff et al. |
| 2008/0086411 | A1 | 4/2008 | Olson et al. |
| 2008/0169342 | A1 | 7/2008 | Gonen |
| 2008/0183634 | A1 | 7/2008 | Sadler |
| 2008/0208721 | A1 | 8/2008 | Bertogg |
| 2008/0275772 | A1 * | 11/2008 | Suryanarayana et al. ...... 705/14 |
| 2009/0125402 | A1 | 5/2009 | Voltmer et al. |
| 2009/0132641 | A1 * | 5/2009 | Sanguinetti et al. .......... 709/203 |
| 2009/0138358 | A1 | 5/2009 | Gonen et al. |
| 2009/0228406 | A1 | 9/2009 | Lopez et al. |
| 2013/0110609 | A1 * | 5/2013 | Lee et al. ................... 705/14.27 |
| 2014/0032259 | A1 * | 1/2014 | LaFever et al. .............. 705/7.29 |

FOREIGN PATENT DOCUMENTS

| | | |
|---|---|---|
| JP | 13-195496 | 10/2002 |
| JP | 2002-297840 | 10/2002 |
| JP | 2003-099520 | 4/2003 |
| JP | 2005-008339 | 1/2005 |
| KR | 10-20020084880 | 11/2002 |
| KR | 1020060099489 A | 9/2006 |
| KR | 10-20080008694 | 1/2008 |
| KR | 10-2008-0013246 | 2/2008 |

OTHER PUBLICATIONS

Intl' Search Report and Written Opinion for PCT/2009/031129 dated Jun. 16, 2009, 12 pages.

Intl' Search Report and Written Opinion for PCT/2007/079440 dated Apr. 23, 2008, 10 pages.

Intl' Search Report and Written Opinion for PCT/2008/055687 dated Aug. 20, 2008, 9 pages.

Int'l Search Report and Written Opinion for PCT/2008/055689 dated Jul. 17, 2008, 10 pages.

Int'l Search Report and Written Opinion for PCT/2008/074647 dated Mar. 25, 2009, 8 pages.

Int'l Search Report and Written Opinion for PCT/2009/042812 dated Dec. 21, 2009, 10 pages.

Int'l Search Report and Written Opinion for PCT/2010/021757 dated Aug. 31, 2010, 9 pages.

Int'l Search Report and Written Opinion for PCT/2009/042801 dated Nov. 30, 2009, 15 pages.

World Economic Forum Names RecycleBank a 2009 Technology Pioneer found at Http://Corporate. Recyclebank.com/press-release . . . Dec. 4, 2008 4 pages.

Peretsman, Natalie, "Rewarding Recycling," Scienceline, Jun. 12, 2008, (5 pgs).

Colimore, Edward, "Cherry Hill Starts Cashing in on Recycling," The Philadelphia Inquirer, Jun. 30, 2008, (2 pgs).

Hays, Julia, "Hauler: New Recycling Program Runs Smoothly," Courier-Post, Jul. 1, 2008, (2 pgs).

Its Easy Being Green: It Pays to Recycle, Center for American Progress, Jul. 16, 2008, (2 pgs).

Satullo, Chris, "The Right Kind of 'Nudge' Improves Life for Citizens," The Philadelphia Inquirer, Jul. 20, 2008, (2 pgs).

Glick, Alexis, "Talking Trash.. Literally," The Glick Report, Fox Business, Jul. 31, 2008, (1 pg).

Judkis, Maura, "4 Ways to Earn Cash for Recycling," U.S. News & World Report, Jul. 30, 2008, (2 pgs).

Knoblauch, Jessica A., "Turning Your Trash Into Cash," Plenty Magazine, (3 pgs).

Siegel, Robert, "What's Behind a Patchwork of Recycling Rules?" NPR, Jul. 28, 2008, (3 pgs).

Laidler, John, "Residents Find Recycling Has Its Just Reward," The Boston Globe, Jul. 27, 2008, (2 pgs).

Jones, Charisse, "Residents Reap Rewards for Recycling," USA Today, Jul. 9, 2008, (3 pgs).

Wong, Wylie, "Going Green," Biztech Magazine, Mar. 2008, found at http://www.biztechmagazine.com/article.asp?itemjd=397, (4 pgs.).

(56) References Cited

OTHER PUBLICATIONS

Walsh, Bryan, "Making Recycling Really Pay," Time Magazine, Apr. 11, 2008, found at http://www.time.com/time/health/article/0,8599,1730187,00.html?xid=rss-health, (2 pgs).

Gunther, Marc, "Turning Trash Into Cash," Fortune Magazine, Sep. 20, 2007, found at http://money.cnn.com/2007/09/20/magazines/fortune/recyciebankJortune/index.htm, (3 pgs).

"Bags to Riches," Good Magazine, Mar./Apr. 2007, (1 pg).

Desimone, Bonnie, "Rewarding Recyclers, and Finding Gold in the Garbage," The New York Times, Feb. 21, 2006, found at http://www.nytimes.com/2006/02/21/business/businessspecial/21 recycle.html?_r=2&ore, (3 pgs).

4 Ways to Earn Cash for Recycling, US News and World Report, Jul. 31, 2008, (2 pgs).

Special Report: RecycleBank Set for the UK? Letsrecycle.com, Jul. 25, 2008, (4 pgs).

New 'American Scrap Coalition' Will Address Global Trade Barriers, Reuters, Jun. 12, 2008, (2 Pgs).

"Technology Pioneers 2009," World Economic Forum, (36 pgs).

Desai, Anuj et al., "The Plenty 20 Awards for 2008," (4 pgs).

Jenny Mero, "Wasteful Thinking" Fortune Magazine, Apr. 2008 (1 pg.).

\* cited by examiner

SYSTEM FOR CROSS-INTEGRATION OF CONSUMER LOYALTY PROGRAMS AND METHODS THEREOF

CROSS-REFERENCE TO RELATED APPLICATIONS

This application claims the benefit of U.S. Provisional Patent Application Ser. No. 61/162,093, filed Mar. 20, 2009, the disclosure of which is incorporated herein by reference in its entirety.

BACKGROUND

1. Field of the Invention

The following disclosure generally relates to a system for cross-integration of consumer loyalty programs and methods thereof. More particularly, the following relates to a system for cross-integrating consumer data from separate consumer loyalty programs to create a consumer record and methods thereof.

2. Description of Related Art

Incentive award or reward programs have been developed in a variety of industries to promote customer loyalty. Generally, such programs reward customers for repeat business with the same merchant or service provider by accumulating reward points, which can then be redeemed in a plurality of ways, for example, a customer could exchange the reward points for additional goods and services that may be selected from an approved list or redemption catalog. The reward points are usually calculated using a predetermined formula or ratio that relates a customer's purchase volume (i.e., in terms of money value or some other volume parameter) to a certain number of reward points. For example, reward points may be issued on a one-to-one basis with each dollar a customer spends on particular goods and services.

Well known examples of such loyalty programs include "frequent flyer" programs and credit card loyalty programs. An airline typically offers some number of points or airline miles to each consumer that is correlated with the distance traveled. At certain levels or tiers, the points may be redeemed by the consumer for airline tickets or car rentals. Other incentive programs are designed to induce usage of particular financial institutions, such as credit cards or debit cards, by accumulating points based upon the volume of purchases made using that particular financial institution. These points may then be redeemed for selected goods or services provided by the financial institution. Alternatively, a dollar credit amount may also be accumulated through the point system, which may then be applied to a credit or debit balance.

While these separate loyalty programs exist within each merchant, retailer, or the like, no existing centralized or master loyalty program has the ability to interact and exchange information with one another to the ultimate accretive data benefit of all loyalty programs. Crucial consumer information, such as demographic data and shopping habits and usage, are monitored and stored in a loyalty program's database. It would be beneficial for loyalty programs to share this consumer information with one another. Loyalty programs would then likely receive increased loyalty program engagement, new member inquiries, advanced internal reporting, unprecedented access to coalition data based on participation level, and optional access to target specific consumers with specific rewards at specific times with cross-correlated, all-level, data.

As such, there is a need in the industry for a system for cross-integrating consumer data, either in whole or in-part, from separate consumer loyalty programs to create a central consumer loyalty record that pollinates that accumulated data in each individual loyalty program and methods thereof.

SUMMARY

Embodiments of the present invention relate to a system for cross-integrating consumer data from separate consumer loyalty programs to create an aggregated consumer record and methods thereof within a common partner's master loyalty program database. In one embodiment of the present invention, a method for cross-integrating consumer loyalty programs comprises obtaining a first set of consumer data relating to a consumer from a first reward partner, obtaining a second set of consumer data from the consumer, aggregating the first set of consumer data and the second set of consumer data in a database, creating an aggregated consumer record in the database from the aggregated data, and providing access to a portion of the aggregated consumer record to the first reward partner.

In another embodiment of the present invention, a method for cross-integrating consumer loyalty programs comprises establishing a first reward partner, establishing a second reward partner, obtaining a first set of consumer data from the first reward partner, obtaining a second set of consumer data from the second reward partner, aggregating the first set of consumer data and the second set of consumer data in a database, associating the aggregated data with appropriate consumer records in the database to create an aggregated consumer record, and providing accretive access to the aggregated consumer record to the first reward partner and the second reward partner.

In yet another embodiment of the present invention, a system for cross-integrating consumer loyalty programs comprises: a server, accessible via a global computer network, comprising a tangible computer readable medium comprising program instructions, wherein the program instructions are computer-executable to implement: obtaining a first set of consumer data on a consumer from a first reward partner, obtaining a second set of consumer data from the consumer, aggregating the first set of consumer data and the second set of consumer data in a database, creating an aggregated consumer record in the database from the aggregated data, and providing access to the aggregate consumer record to the first reward partner.

The details of one or more embodiments of the present invention are set forth in the accompanying drawings and the description below. Other features and advantages will become apparent from the description and the drawings.

BRIEF DESCRIPTION OF THE DRAWINGS

So the manner in which the above-recited features of the present invention can be understood in detail, a more detailed description of embodiments of the present invention is described below with references to the figures illustrated in the appended drawings.

The figures in the appended drawings, like the detailed description, illustrate only examples of embodiments. As such, the figures and the detailed description are not to be considered limiting, and other equally effective examples are possible and likely, wherein.

DETAILED DESCRIPTION

In the following detailed description, numerous specific details are set forth in order to provide a thorough understanding of exemplary embodiments or other examples described herein. However, it will be understood that these examples may be practiced without the specific details. In other instances, well-known methods, procedures, components and circuits have not been described in detail to avoid obscuring the following description. Further, the examples disclosed are for exemplary purposes only and other examples may be employed in lieu of, or in combination with, the examples disclosed. It should also be noted that the examples presented herein should not be construed as limiting of the scope of embodiments of the present invention, as other equally effective examples are possible and likely.

Embodiments of the present disclosure generally relate to a system for cross-integration of consumer loyalty programs and methods thereof. More particularly, the following relates to a system for cross-integrating consumer data from separate consumer loyalty programs to create a consumer record and methods thereof.

As used herein, the term "reward" may comprise any quantity of products, services, coupons, gift certificates, rebates, awards, reward points, bonus points, credits or debits to a financial instrument, any combination of these, and/or the like.

Figure 1A:
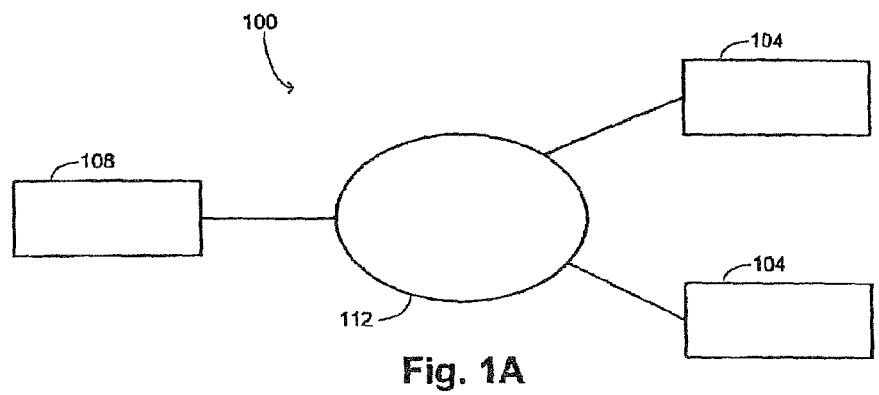
FIGS. 1A-1D depict schematic illustrations of individual loyalty programs that may be utilized in accordance with one embodiment of the present invention.

Various loyalty systems may involve a variety of different entities. A simple example of a traditional loyalty system is shown in FIGS. 1A-1D. In FIG. 1A, the loyalty system 100 operates for a plurality of merchants $104_{1-N}$ related by a merchant association 112. A single user 108 provides an instrument that may be used to identify individual customers and their participation within the loyalty system 100. For example, the merchant association 112 may simply be a commercial retail entity, such as "Store X" and merchants $104_{1-N}$ may be retail outlets for that entity. The identification instrument issued by the issuer 108 may be a loyalty card that identifies the commercial retail entity 112. A customer may then present her card when she makes purchases at any retail outlet of Store X and accumulate points. Such points may be redeemed for merchandise from a catalog at some later date when certain point-total levels are reached.

Figure 1B:
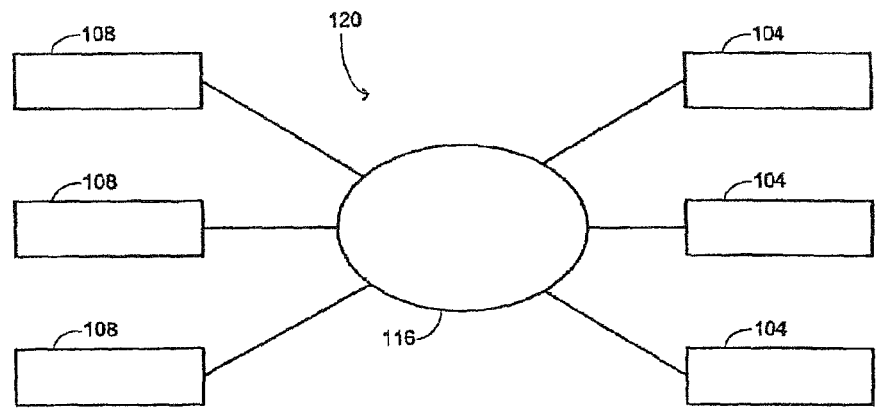
Figure 1C:
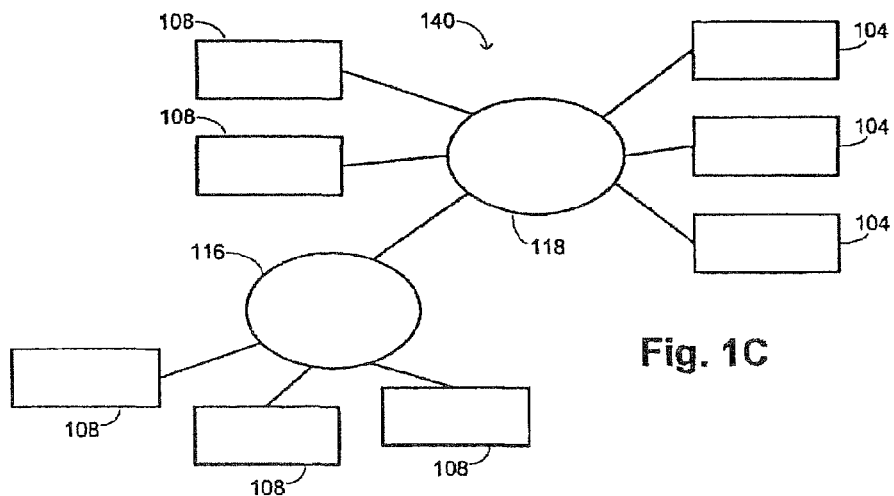
Figure 1D:
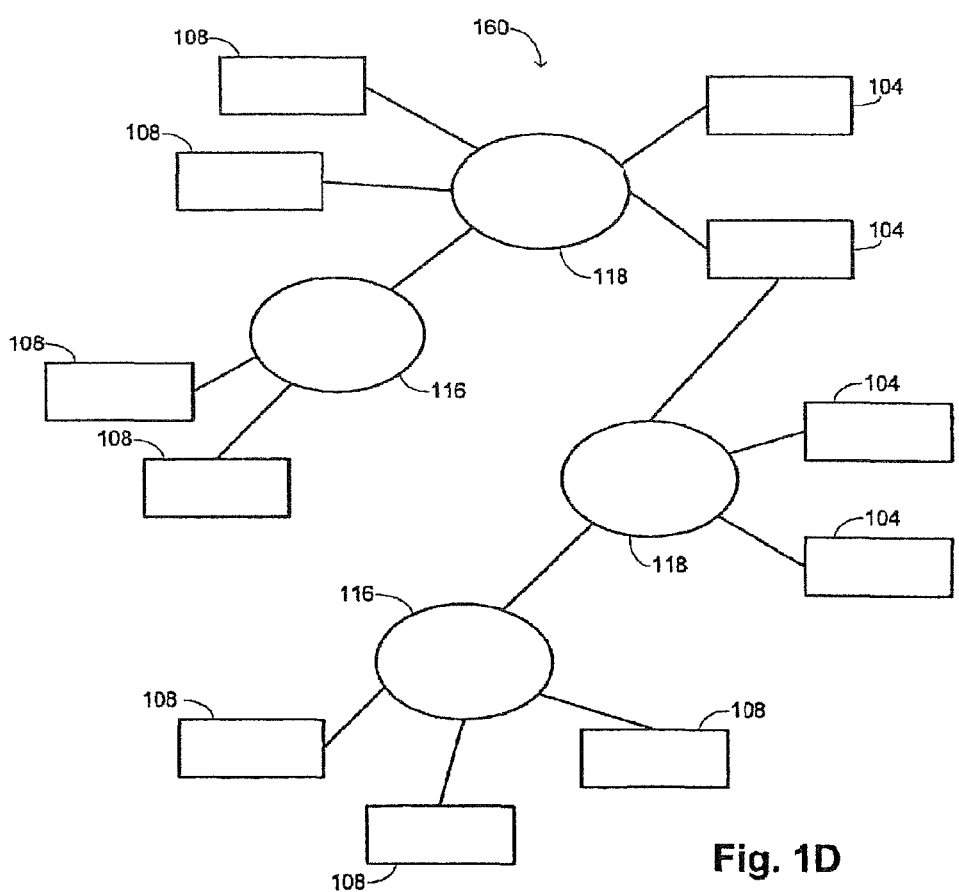

FIGS. 1B-1D illustrate slightly more sophisticated loyalty systems 120, 140 and 160, respectively. A plurality of merchants $104_{1-N}$ and a plurality of issuers $108_{1-N}$ interact separately with the issuer association 116 in administering the loyalty program. For example, the issuer association 116 may be a credit organization that interacts with a plurality of banks in providing credit to customers. A customer having an instrument, such as a credit card, issued by any of the banks and bearing the credit organization's logo may accumulate loyalty points whenever he uses the card. The card may be used to obtain credit for purchases at any of the participating merchants. Upon reaching certain point totals, the customer may redeem the points for goods or services from organizations having a suitable arrangement with the issuer association 116 and/or individual issuers $108_{1-N}$.

An aggregator 118 may then be added, as shown in FIG. 1C, that acts as an intermediary between issuers $108_{1-N}$ and merchants $104_{1-N}$, and functions similar to the issuer association 116 shown in FIG. 1B. This basic structure may then be extended in further embodiments, as shown in FIG. 1D, where the loyalty system 160 includes a plurality of aggregators $118_{1-N}$, each of which interacts with at least one issuer association $116_{1-N}$, directly with one or more issuers $108_{1-N}$, merchants $104_{1-N}$, and other aggregators $118_{1-N}$.

While FIGS. 1C and 1D show those merchants and issuers who participate in some aspect of a loyalty program system, more generally there will also exist merchants and issuers who do not participate in the loyalty system. Such nonparticipating merchants and issuers may nevertheless wish to share in a financial infrastructure for processing transactions with the participating merchants and issuers. Such a financial infrastructure provides a general interconnection among merchants and issuers that permits credit, debit, check, store-value, and other types of transactions to be executed. The infrastructure functions generally by permitting a merchant to transmit details of a transaction to a centralized authority, which then ensures that any necessary authorization from an issuer (or issuer association) is obtained so the transaction may be approved.

One of the core benefits of each of the exemplary loyalty programs depicted in FIGS. 1A-1D, is that the merchant, issuer, issuer association, or aggregator, can obtain a plethora of information from each of the consumers subscribed to the respective loyalty programs. The plethora of information may relate to consumer demographics information (e.g., residence location, age, gender, etc.), consumer shopping habits (e.g., types of purchases, number of products purchased, amount spent), or any other type of data that may be acquired from either the consumer's shopping habits with the merchant, issuer, etc., or provided by the consumer in connection with joining the loyalty program or maintain a status within the loyalty program. In many embodiments of the present invention, the basic structure of the loyalty programs generally include a general purpose computer, as discussed below.

Figure 2:
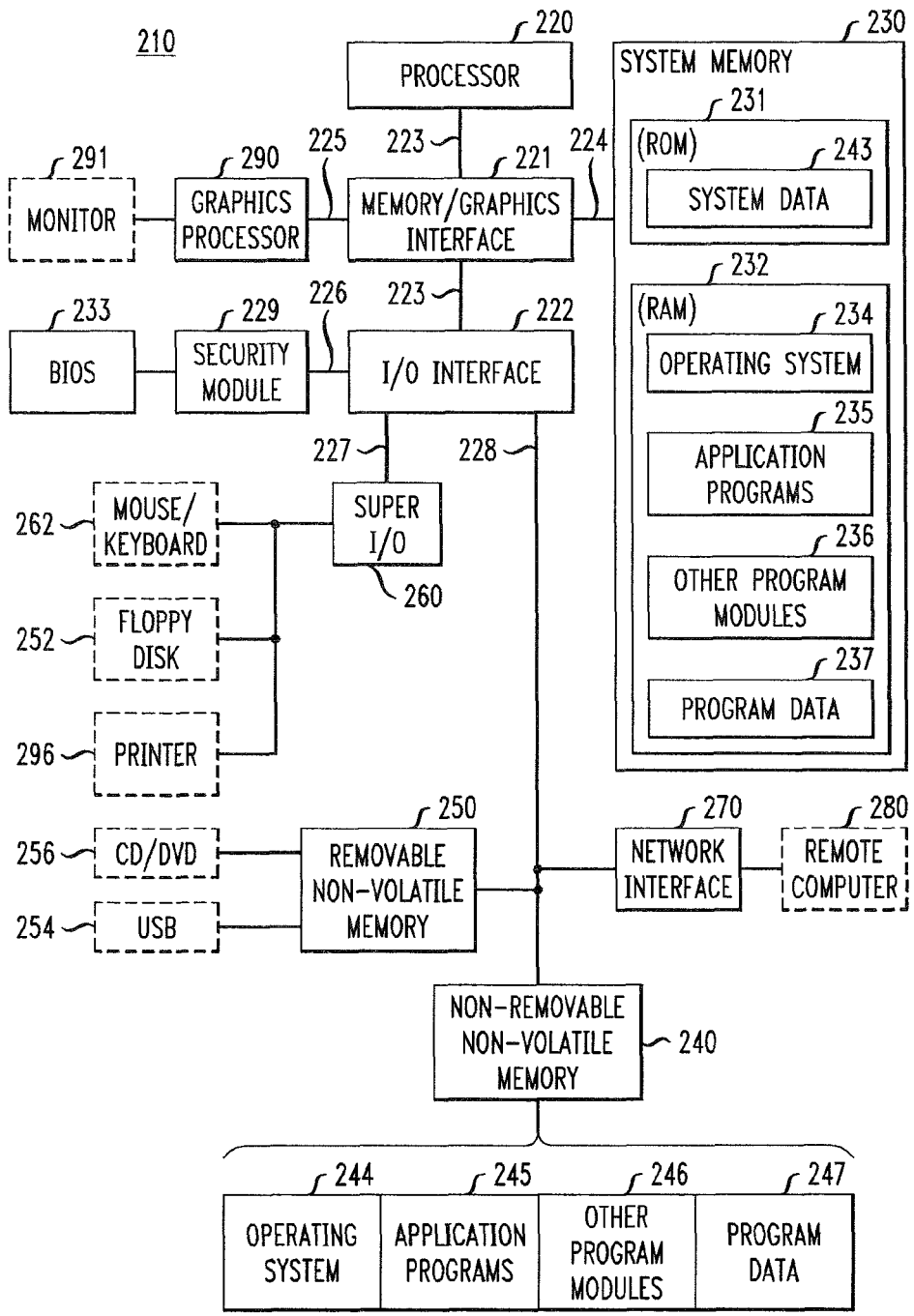
FIG. 2 depicts a block diagram of a general purpose computer system in accordance with another embodiment of the present invention.

In accordance with one embodiment of the present invention, any of the issuers or merchants may comprise a general purpose computer, for example, as shown in the form of a computer 210 depicted in FIG. 2. Components shown in dashed outline are not part of the computer 210, but are used to illustrate the exemplary embodiment of FIG. 2. Components of computer 210 may include, but are not limited to, a processor 220, a system memory 230, a memory/graphics interface 221, also known as a Northbridge chip, and an I/O interface 222, also known as a Southbridge chip. The system memory 230 and a graphics processor 290 may be coupled to the memory/graphics interface 221. A monitor 291 or other graphic output device may be coupled to the graphics processor 290.

A series of system busses may couple various system components, including a high speed system bus 223 between the processor 220, the memory/graphics interface 221 and the I/O interface 222, a front-side bus 224 between the memory/graphics interface 221 and the system memory 230, and an advanced graphics processing (AGP) bus 225 between the memory/graphics interface 221 and the graphics processor 290. The system bus 223 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. The system ROM 231 may contain permanent system data 243, such as identifying and manufacturing information. In some embodiments, a basic input/output system (BIOS) may also be stored in system ROM 231. RAM 232 typically contains data and/or program modules that are immediately accessible to and/or presently being operated on by processor 220. By way of example, and not limitation, FIG. 2 illustrates operating system 234, application programs 235, other program modules 236, and program data 237.

The I/O interface 222 may couple the system bus 223 with a number of other busses 226, 227 and 228 that couple a variety of internal and external devices to the computer 210. A serial peripheral interface (SPI) bus 226 may connect to a basic input/output system (BIOS) memory 233 containing the basic routines that help to transfer information between elements within computer 210, such as during start-up.

In some embodiments, a security module 229 may be incorporated to manage metering, billing, and enforcement of policies. The security module 229 may comprise any known security technology suitable for embodiments disclosed herein.

A super input/output chip 260 may be used to connect to a number of "legacy" peripherals, such as floppy disk 252, keyboard/mouse 262, and printer 296, as examples. The super I/O chip 260 may be connected to the I/O interface 222 with a low pin count (LPC) bus, in some embodiments. The super I/O chip 260 is widely available in the commercial marketplace.

In one embodiment, bus 228 may be a Peripheral Component Interconnect (PCI) bus, or a variation thereof, may be used to connect higher speed peripherals to the I/O interface 222. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 228 may be an advanced technology attachment (ATA) bus, in the form of a serial ATA bus (SATA) or parallel ATA (PATA).

The computer 210 may also include other removable/non-removable, volatile/nonvolatile computer storage media. By way of example only, FIG. 2 illustrates a hard disk drive 240 that reads from or writes to non-removable, nonvolatile magnetic media. Removable media, such as a universal serial bus (USB) memory 254 or CD/DVD drive 256 may be connected to the PCI bus 228 directly or through an interface 250. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 2, provide storage of computer readable instructions, data structures, program modules and other data for the computer 210. In FIG. 2, for example, hard disk drive 240 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a mouse/keyboard 262 or other input device combination. Other input devices (not shown) may include a microphone, joystick, game pad, satellite dish, scanner, or the like. These and other input devices are often connected to the processor 220 through one of the I/O interface busses, such as the SPI 226, the LPC 227, or the PCI 228, but other busses may be used. In some embodiments, other devices may be coupled to parallel ports, infrared interfaces, game ports, and the like (not depicted), via the super I/O chip 260.

The computer 210 may operate in a networked environment using logical connections to one or more remote computers, such as a remote computer 280 via a network interface controller (NIC) 270. The remote computer 280 may be a personal computer, a server, a router, a network PC, a peer device or other common network node, and typically includes many or all of the elements described above relative to the computer 210. The logical connection between the NIC 270 and the remote computer 280 depicted in FIG. 2 may include a local area network (LAN), a wide area network (WAN), or both, but may also include other networks. Such networking environments are commonplace in offices, enterprise-wide computer networks, intranets, and the Internet.

In some embodiments, the network interface may use a modem (not depicted) when a broadband connection is not available or is not used. It will be appreciated that the network connection shown is exemplary and other means of establishing a communications link between the computers may be used.

Although the computer 210 of FIG. 2 is described as an exemplary computing device for various applications of embodiments of the present invention, it should be appreciated, a multitude of similar computing devices exist and are equally suitable for embodiments of the present invention. It is further understood by embodiments of the present invention, a computing device may comprise all of the elements disclosed in FIG. 2, or any combination of one or more of such elements, in order to perform the necessary functions of the embodiments of the present invention.

It is understood by embodiments of the present invention that a computer, such as the one depicted in FIG. 2, may be connected to a computer network or system. A computer network includes the Internet, a global computer network, an internal computer network, dedicated server networks, and the like.

Figure 3:
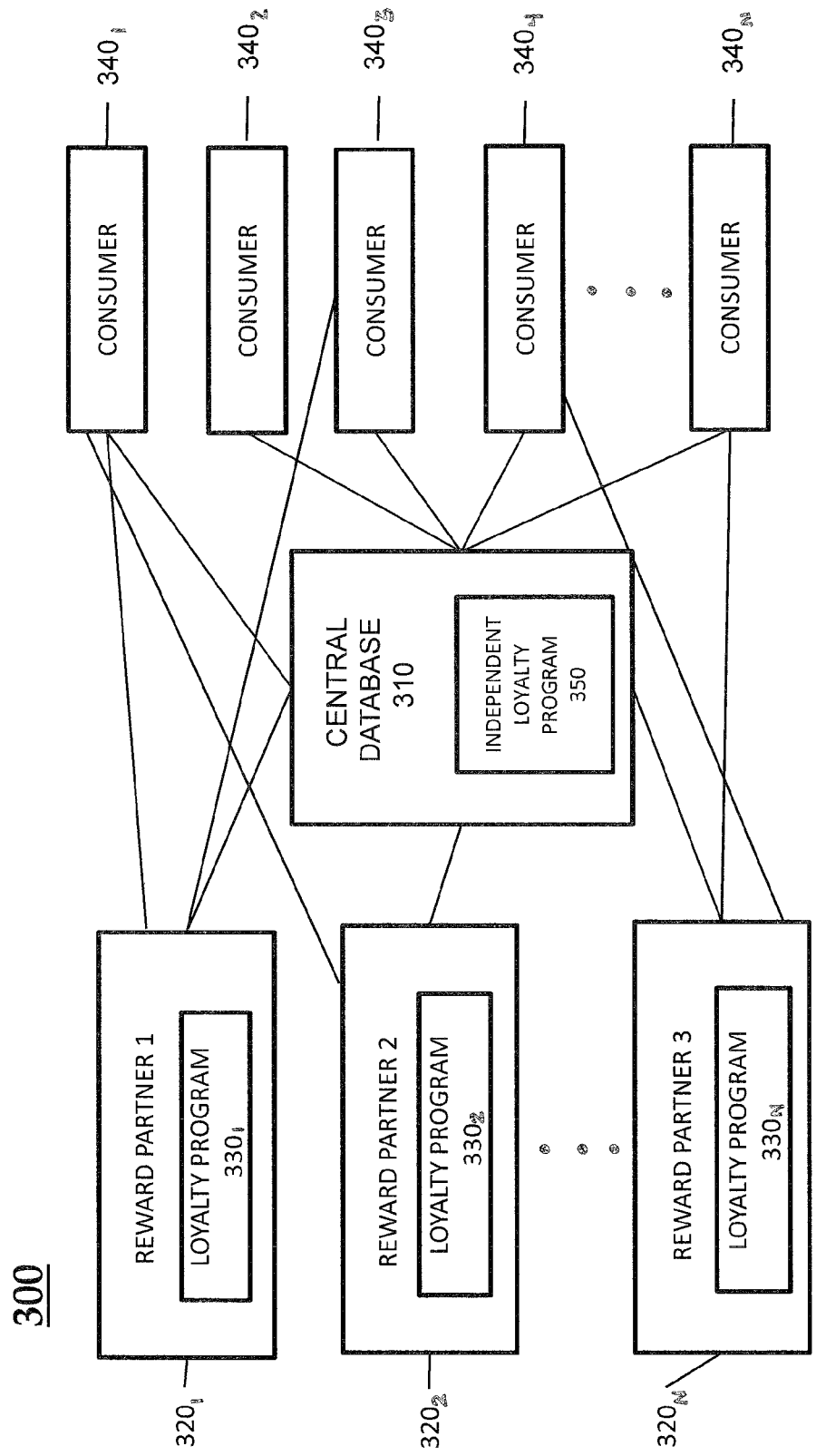
FIG. 3 depicts a block diagram of a general cross-integration consumer loyalty program.

FIG. 3 depicts a basic system-level diagram of a cross-integration of consumer loyalty programs in accordance with one embodiment of the present invention. The system 300 generally comprises at least one reward partner $320_1$, a second reward partner $320_2$, up to reward partner N $320_N$. Each reward partner $320_N$ is in communication with a database 310, which in turn communicates with each consumer $340_N$. Each consumer $340_N$ may also be in communication with all or some of the reward partners $320_N$.

Although FIG. 3 depicts three reward partners (labeled "Reward Partner 1" $320_1$, "Reward Partner 2" $320_2$ and "Reward Partner N" $320_N$), it should be appreciated that N represents any number of reward partners in accordance with embodiments of the present invention. For ease of reference, as used herein, each of the term "reward partner" may refer to any one or all of the reward partners $320_1$, $320_2$ and $320_N$ within the system 300. As understood by embodiments of the present invention, a reward partner may include any person, business or entity, capable of participating in the system and methods disclosed herein.

Likewise, although FIG. 3 explicitly depicts five consumers, $340_1$, $340_2$, $340_3$, $340_4$ and $340_N$, there may be more or less in accordance with certain embodiments of the present invention. That is, in certain embodiments, multiple consumers may perform the same or similar functions as one another. For ease of reference, as used herein, each of the term "consumer" may refer to any one or all of the consumers $340_1$, $340_2$, $340_3$, $340_4$ and $340_N$ within the system 300. As understood by embodiments of the present invention, a consumer may include any person, business or entity, capable of participating in the system and methods disclosed herein.

In certain embodiments, the consumer 340 is typically enrolled in an independent loyalty program 350 within the database 310. The enrollment may be free of charge or may require an annual or one-time fee. Enrollment may be signified through an enrollment card, ID number, or the like, and entices the consumer 340 to continue to purchase goods and/or services, recycle, participate in eco-friendly activities, or the like, by rewarding the consumer 340 with points. Once the points have accumulated to a certain point-level, the consumer 340 may then redeem the points for other goods, services, cash refunds, incentives, coupons, credits, vouchers, gift certificates, and the like.

The independent loyalty program 350 retrieves consumer information from the consumer 340 and stores the consumer information in the central database 310. Each consumer 340 has a separate unique entry in the central database, distinguishable by name, a unique ID, or the like. The central database 310 stores a plethora of information on the consumer 340 including, but not limited to, name, demographic information (e.g., residence location, age, gender, etc.), consumer shopping habits (e.g., types of purchases, number of products purchased, amount spent), or any other type of data that may be acquired from the consumer's shopping habits through the independent loyalty program 350.

In accordance with one embodiment of the present invention, any consumer 340 may concurrently be enrolled in any loyalty program 330 associated with a corresponding reward partner 320. In many embodiments of the present invention, the loyalty program 330 is similar to the independent loyalty program 350 described above. The loyalty program 330 retrieves, transmits, and stores consumer information, such as demographic information, shopping habits, or the like, within the reward partner's server (not shown). The reward partner 320 then transmits the consumer information to the central database 310, where a consumer's unique identifier, or data point, such as name and address, are paired. Once matched up, the database 310 may then store all new, unique consumer information, which then in turn may be transmitted to other participating reward partners 320. It should be appreciated that any number of reward partners 320 and consumers 340 may participate in accordance with embodiments of the present invention.

Figure 4:
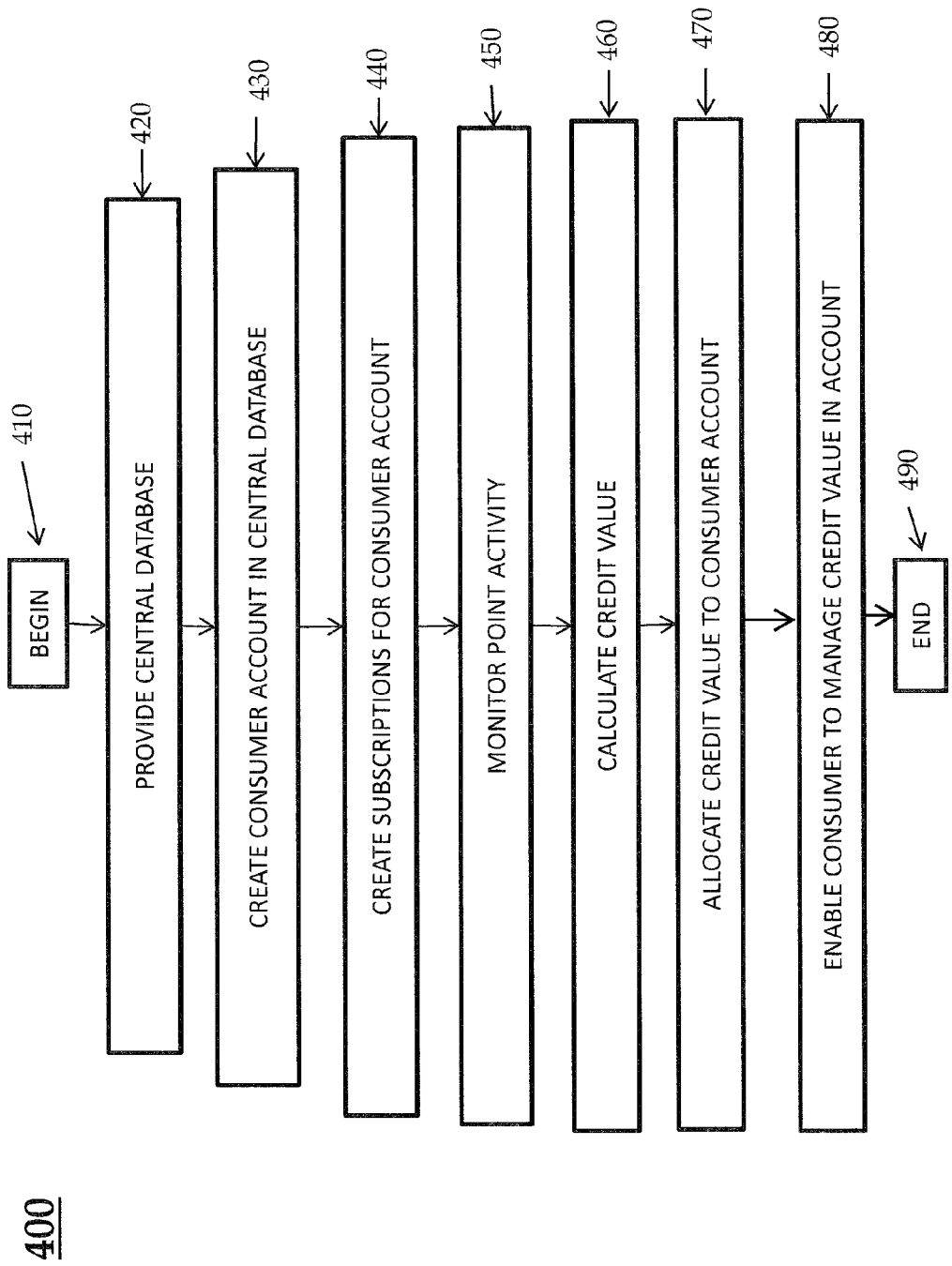
FIG. 4 depicts a flowchart of a method for managing an independent loyalty program using a point-source asset system in accordance with one exemplary embodiment of the present invention.

FIG. 4 depicts a flowchart of a method of managing an incentive-based loyalty program using a point system, in accordance with one exemplary embodiment of the present invention. For convenience, the method 400 is described with reference to the general system 300 of FIG. 3. It should be appreciated, however, that the method 400 may be carried out using other architectures and environments as well.

The method 400 begins at step 410. At step 420, a central database 310 hosted by a server (not shown) is provided in communication with at least one consumer 340.

At step 430, the consumer's account is created within the database 310 for the consumer 340. The consumer 340 may be enticed to join the independent loyalty program 350 to redeem rewards at participating reward partners 320, discussed below. At step 440, a subscription is created within the consumer's account. Generally, when the subscription is created, at least one point associated with the subscription is also designated within the consumer's account.

At step 450, as the consumer 340 participates in the independent loyalty program 350, activity associated with each point is monitored. The activity associated with each point may greatly vary. Points may accumulate by purchasing goods and/or services, recycling, conducting business in an eco-friendly manner, or the like.

At step 460, a credit value, or units of credit value, may be calculated, correlating to the monitored activity. The credit value may be derived from a process that takes as an input, for example, a quantization or qualification of the activity associated with the particular point. Alternative algorithms may account for at least one of a value of products or services obtained from a participating business, an amount of money spent on goods or services at a participating business, an amount of recyclable material recycled in a recycling program, the comparative decrease in waste between consecutive participation periods, or any other source of measurable data suitable for embodiments of the present invention.

As an alternative, credit values may also be calculated in a fixed amount. For example, a fixed amount of units in response to a single purchase from a participating reward partner or business. Or similarly, a fixed amount of units for mere participation in a program. The fixed amount may be activated by a purchase, a patronization, a service, a delivery, or any other activation activity suitable for embodiments of the present invention.

At step 470, the calculated credit value, correlating to the activity, is allocated to the consumer's account. The credit value may be stored with the consumer's account in the central database 310 as a data point. In many embodiments, the calculated credit value is added to a cumulative tally of units stored with the consumer's account, reflective of the consumer's cumulative participation in the independent loyalty system 350.

At step 480, the consumer 340 is permitted to manage the credit value units associated with the consumer account. In accordance with one embodiment of the present invention, credit value units may be exchanged for rewards. As used herein, the term "rewards" may refer to any service, good, discount, price reduction, monetary grant, or other incentive, financial or otherwise, which is obtained as a result of an exchange of units. Rewards may include, but are not limited to, gift certificates, coupons, price-reduced or free goods and/or services, or any other reward suitable within the scope of embodiments of the present invention. The method ends at step 490.

Figure 5:
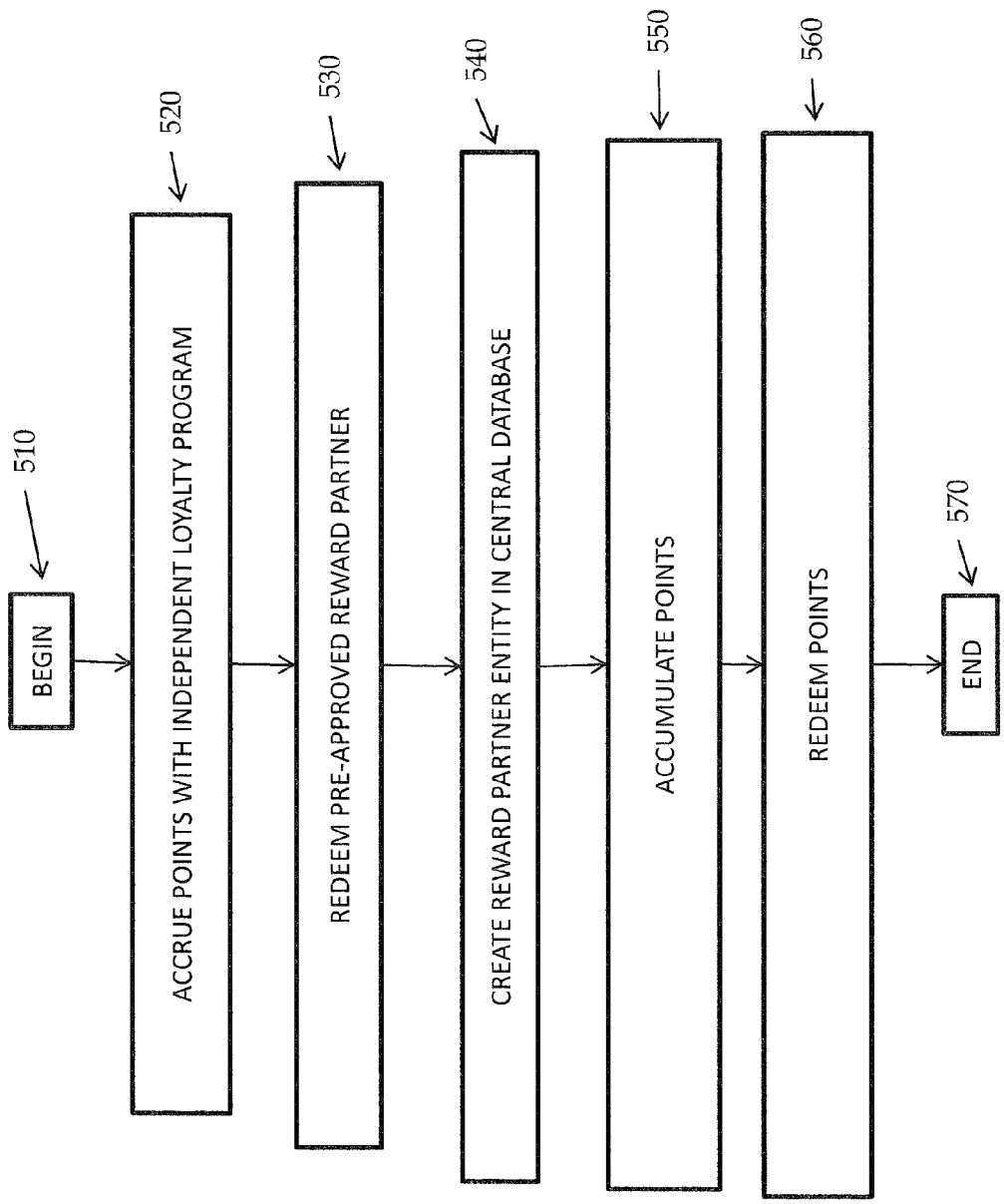
FIG. 5 depicts a flowchart of a method for establishing a reward partner in connection with a database in accordance with another embodiment of the present invention.

FIG. 5 depicts a flowchart of a method for establishing a reward partner in connection with a central database in accordance with another embodiment of the present invention. For convenience, the method 500 is described with reference to the general system 300 of FIG. 3. It should be appreciated, however, that the method 500 may be carried out using other architectures and environments as well.

The method 500 begins at step 510. At step 520, a consumer 340 accrues points through the independent loyalty program 350. Points may be accrued by purchasing goods and/or services, recycling, engaging in eco-friendly behavior, or the like. As described in method 400, point accumulation may vary upon an algorithm, point system, business, or the like. Points are accumulated within a consumer's account within the central database 310.

At step 530, the independent loyalty program redeems pre-approved reward partners 320. As described in method 300, a reward partner 320 may establish a partnership with the independent loyalty program to allow for a consumer 340 to redeem points at a reward partner location. Incentives to create this partnership include, but are not limited to, increase of consumer interest with the reward partner 330, consumer attraction to the reward partner 320, increase in advertisement for the reward partner 320, increase in reward partner sales, gaining consumer data from the central database 310, and the like.

At step 540, a reward partner entity is created within the database 310. Once the reward partner entity is created, similar data points between a consumer 340 belonging to the reward partner's loyalty program 330 and the same consumer 340 belonging to the independent loyalty program 350 are matched up. The data points may include name and/or address, or the like.

At step 550, the consumer 340 may accumulate points, similar to that of method 400. The consumer 340 may participate in the independent loyalty program 350, and activity associated with each point is monitored. The activity associated with each point may vary greatly. Points may accumulate by purchasing goods and/or services, recycling, conducting business in an eco-friendly manner, or the like. Points are saved within the consumer's account within the central database 310, concurrently with consumer data, such as shopping habits and demographic data, and the like. As discussed in method 400, point accumulation may vary based on business, entity, algorithm, or the like.

At step 560, the consumer 340 may redeem points through any participating reward partner 320. Points may be redeemed in a voucher, gift certificate, coupon, credit card, debit card, and the like, to be used at a participating reward partner 320. In the same process, the reward partner's loyalty program 330 may track purchases by the consumer 340 and update the consumer data. This consumer data may then be shared with the central database 310, which may then be shared with other participating reward partners 320. The method 500 ends at step 570.

Figure 6:
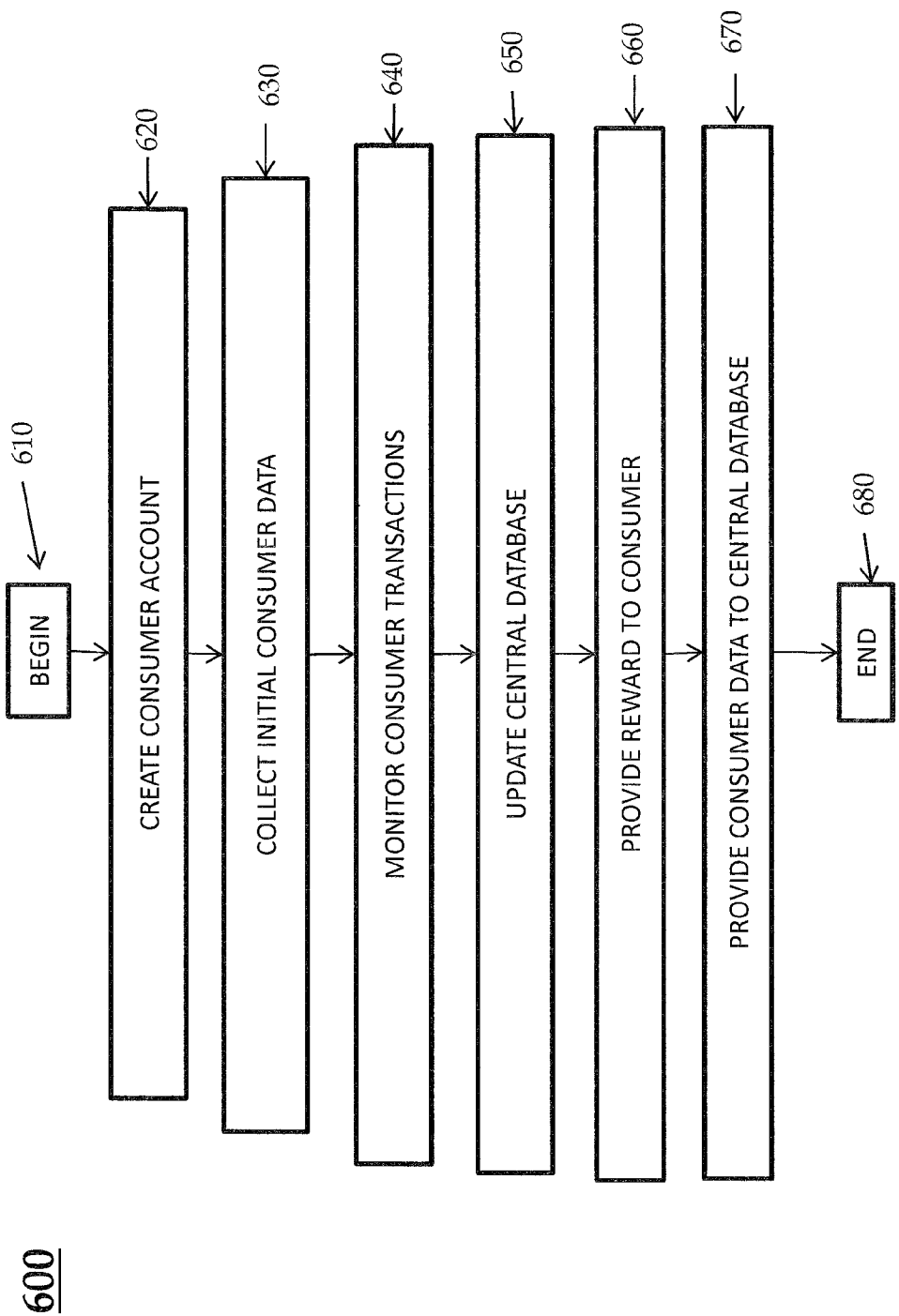
FIG. 6 depicts a flowchart of a method for providing consumer information to a database in accordance with an embodiment of the present invention.

FIG. 6 depicts a flowchart of a method for providing consumer information to a central database in accordance with an embodiment of the present invention. For convenience, the method 600 is described with reference to the general system 300 of FIG. 3. It should be appreciated, however, that the method 600 may be carried out using other architectures and environments as well.

The method 600 begins at step 610. At step 620, a consumer account is created within the independent loyalty program 350. In some embodiments of the present invention, a new data entry is created within the database 310. At step 630, initial consumer data is collected and saved to the consumer account or data entry within the database 310. Initial consumer data may include, but is not limited to, name, consumer location, age, sex, and the like.

At step 640, the independent loyalty program 350 monitors transactions made by the consumer 340. Monitoring consumer transactions allows for the consumer's shopping habits to be tracked and saved within the database 310. Examples of shopping habits may include, but are not limited to, groceries the consumer 340 buys, sales the consumer 340 shops, destinations the consumer 340 flies to, the consumer's preference to coffee shops, and the like. This information would allow the independent loyalty program 350 and the reward partner's loyalty program 320 to target specific consumers 340. At step 650, the consumer account within the database 310 is updated with this information.

At step 660, in some embodiments of the present invention, a reward is provided to the consumer 340. The reward, discussed above, may be used at any participating reward partner location or alternatively, through a participating reward partner's loyalty program 330. The reward may be in the form of a coupon, voucher, gift certificate, store credit, credit card, debit card, discount, any combination thereof, and the like.

At step 670, the reward partner 320 provides consumer data to the database 310. As discussed above, consumer data from the reward partner's loyalty program 330 is transmitted to the corresponding consumer's account within the central database 310. The consumer data from both loyalty programs is matched via a data point, such as name or address, or the like. The method 600 ends at step 680.

Figure 7:
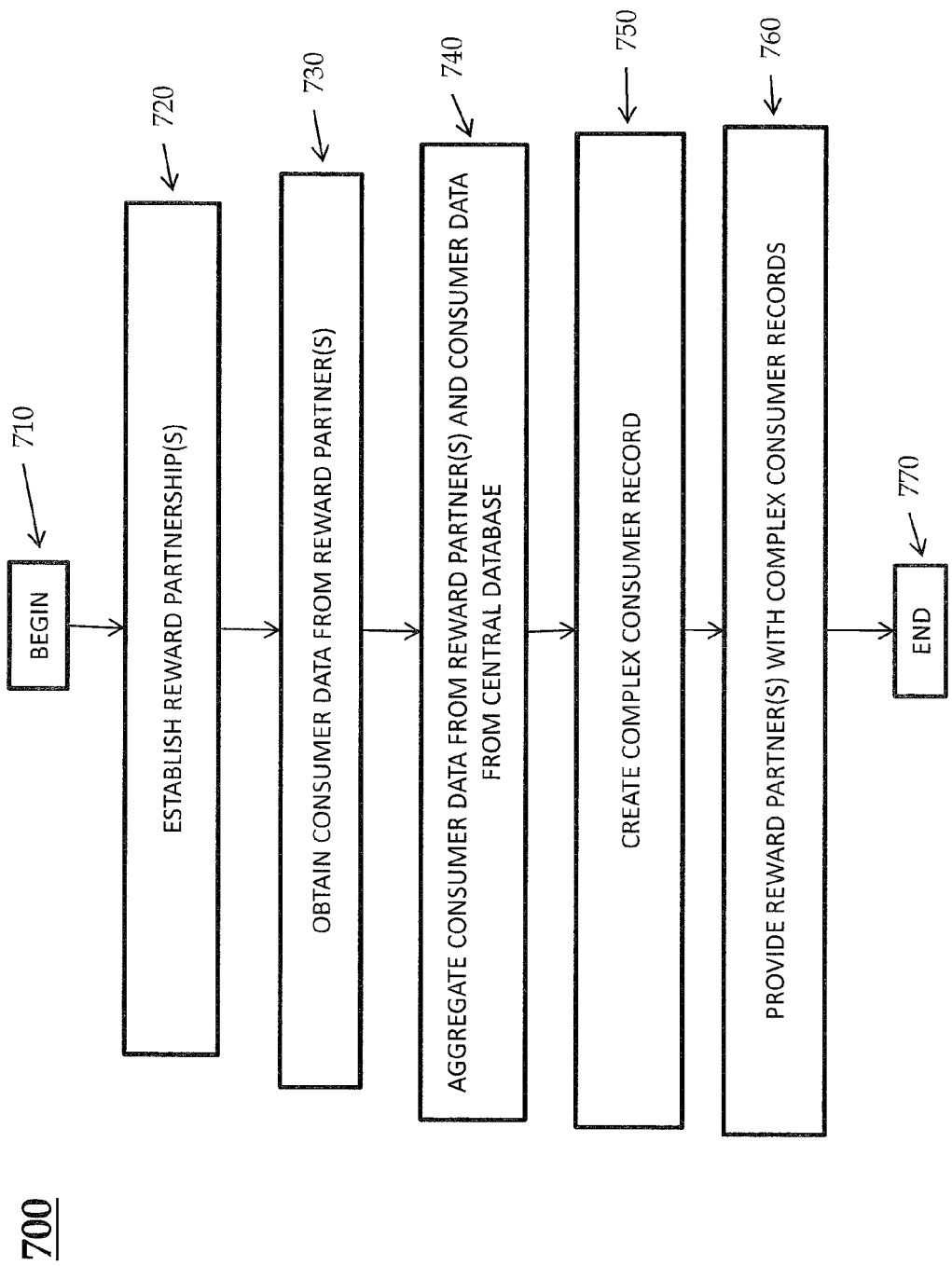
FIG. 7 depicts a flowchart of an exemplary method in accordance with one embodiment of the present invention.

FIG. 7 depicts a flowchart of an exemplary method in accordance with one embodiment of the present invention. For convenience, the method 700 is described with reference to the general system 300 of FIG. 3. It should be appreciated, however, that the method 700 may be carried out using other architectures and environments as well.

The method 700 begins at step 710. At step 720, a reward partnership is established. As discussed above, the reward partnership will allow for a reward partner 320 to increase business and entice customers 340 to do business with that reward partner 320.

At step 730, consumer data is obtained from the reward partners 320. Consumer data may comprise an electronically formatted customer list from the reward partner's loyalty program 330, including pertinent consumer data, as is usually collected in the loyalty programs 330 described in FIGS. 1A-1D, as well as FIG. 3. Generally, the pertinent consumer data is relevant to the reward partners' general business. For example, if the reward partner 320 is the in the grocery store business, the pertinent consumer data may comprise the consumer's name, basic demographic information (e.g., address, age, gender, etc.) and information relevant to the consumer's grocery shopping habits (e.g., amount spent per week, preference of organic foods, ratio between name brand versus generic brand purchased, etc.). As understood by embodiments of the present invention, the information that may be provided by the reward partner 320 may have no minimum or maximum threshold of detail, complexity or relevance.

To further the example above, whereby the reward partner 320, is in the grocery store business, a second reward partner $320_2$ may be in the pharmaceutical business. Thus, in this example, the pertinent consumer data from the second reward partner $320_2$ may comprise basic consumer demographic information, as well as the consumer's relevant pharmaceutical shopping habits (e.g., how much is spent on over-the-counter versus prescription medications, types of nutritional supplements purchased, etc.). While a pharmaceutical reward partner may be obliged to follow certain federal regulations regarding the sharing of medical information, there is still plenty of information not subject to those regulations, which may be provided in accordance with embodiments of the present invention.

While the collection of data from reward partners 320 may be extended to as many reward partners 320 as exist in any particular embodiment, in the basic exemplary embodiment of FIG. 7, only step 730 relates to the obtaining of data. Alternative embodiments of the present invention appreciate the scalability of the exemplary method, and nothing contained herein should be considered limiting to the number or size of the reward partners 320.

At step 740, the consumer data from the reward partners 320 and the consumer data from the database 310 are aggregated together. In many embodiments, whereby the database 310 comprises an independent loyalty program 350, the database 310 is hosted on a server (not shown), and may be utilized for hosting the independent loyalty program 350, as well as the system 300 of the embodiments of the present invention. For example, in one embodiment, the database, server and associated software to administer the database are described in detail in U.S. patent application Ser. No. 11/854, 387, published on Mar. 6, 2008 as United States Patent Application Publication No. 2008/0059970, the disclosure of which is incorporated herein by reference in its entirety.

At step 750, the consumer data within the database 310 may be paired with consumer records in the event the records already exist to create an aggregate consumer record. Any number of data points may be used to match or pair records, for example, using a name and address of a consumer 340. By utilizing a plurality of data points, the likelihood of false records and error is minimized. However, with certain embodiments of the present invention, data may be paired by as few as a single data point.

The resulting pairing generates an enhanced profile of each consumer 340 from a plurality of different sources (i.e., reward partners 320) within each aggregated consumer record. As the system 300 grows, so does probability of growth for the amount of data for any individual aggregate consumer record. In the event no record exists in the database, a new record may be created and subsequently added to when another reward partner 320 also identifies that consumer 340 and provides additional consumer data.

At step 760, the reward partners 320 are given access to the aggregate consumer records. The access for each of the reward partners 320 will be determined by the relationship hierarchy, discussed below and shown in FIG. 10, between the independent loyalty program 350 and the reward partners 320. There may be any number of levels within the relationship hierarchy, for example up to six or more levels, as shown in the exemplary embodiment of FIG. 10, discussed below. The method 700 ends at step 770.

Figure 8:
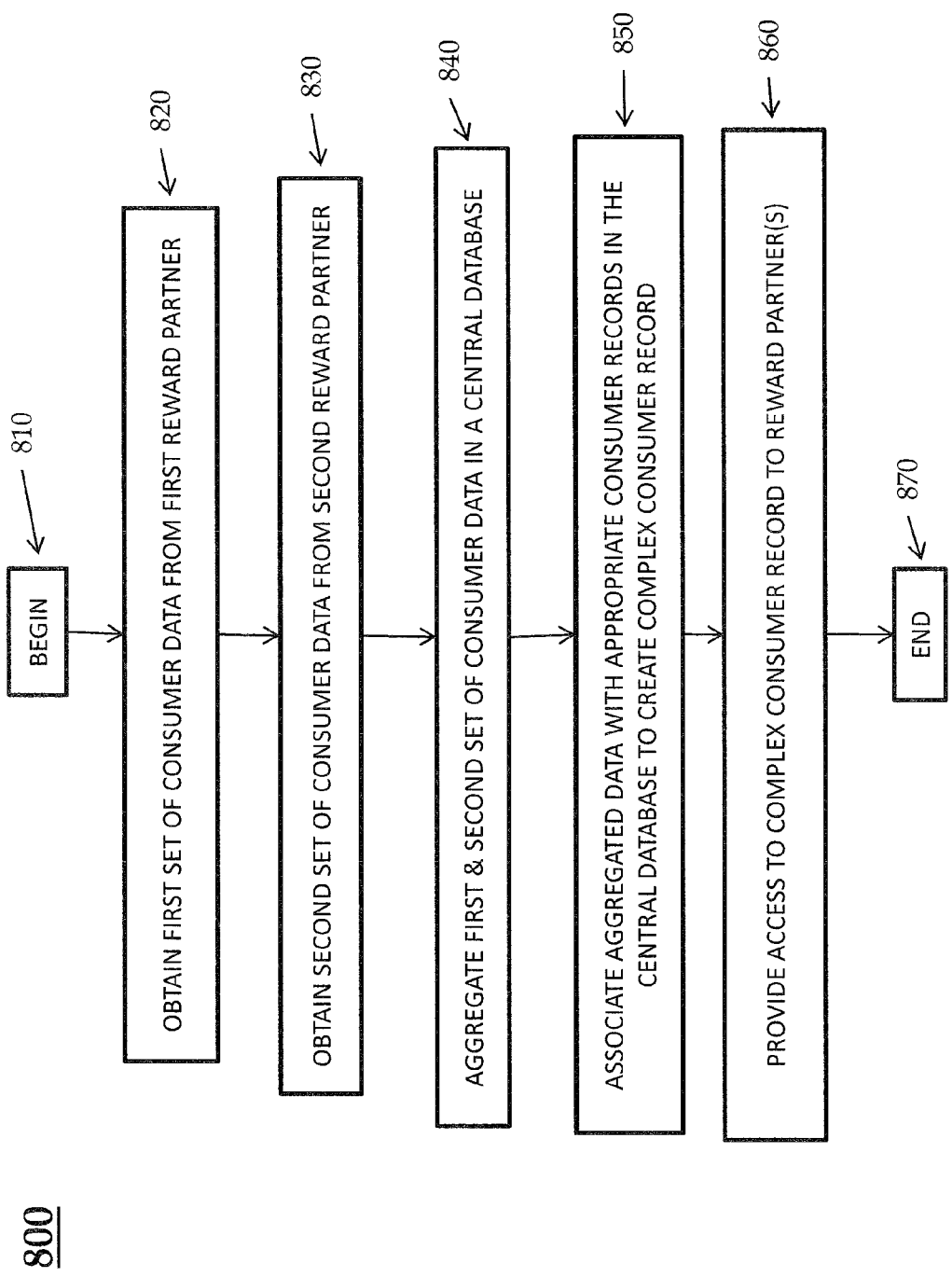
FIG. 8 depicts a flowchart of an exemplary method in accordance with one embodiment of the present invention.

FIG. 8 depicts a flowchart of an exemplary method in accordance with one embodiment of the present invention. For convenience, the method 800 is described with reference to the general system 300 of FIG. 3. It should be appreciated, however, that the method 800 may be carried out using other architectures and environments as well.

The method 800 begins at step 810. At step 820, a first set of consumer data from a first reward partner $320_1$ is obtained. The first set of consumer data may comprise an electronically formatted customer list from the first reward partner's own loyalty program 330, including pertinent customer/consumer data, as is usually collected in the loyalty programs 330 described in FIGS. 1A-1D and FIG. 3. Generally, the pertinent consumer data is relevant to the reward partners' general business. For example, if the reward partner 320 is in the grocery store business, the pertinent consumer data may comprise the consumer's name, basic demographic information (e.g., address, age, gender, etc.) and information relevant to the consumer's grocery shopping habits (e.g., amount spent per week, preference of organic foods, ratio between name brand versus generic brand purchased, etc.). As understood by embodiments of the present invention, the information that may be provided by the first reward partner $320_1$ may have no minimum or maximum threshold of detail, complexity or relevance.

At step 830, a second set of consumer data from a second reward partner $320_2$ is obtained. Similar to step 820, the second reward partner $320_2$ may provide consumer data in an electronic format, including a customer list from the second reward partner's own loyalty program 330, including pertinent customer/consumer data, as is usually collected in the loyalty programs 330 described in FIGS. 1A-1D and FIG. 3. Further to the example above, whereby the first reward partner $320_1$ is in the grocery store business, the second reward partner $320_2$ may be in the pharmaceutical business. Thus, in this example, the pertinent consumer data from the second reward partner $320_2$ may comprise basic consumer demographic information, as well as the consumer's relevant pharmaceutical shopping habits (e.g., how much is spent on over-the-counter versus prescription medications, types of nutritional supplements purchased, etc.). While a pharmaceutical reward partner may be obliged to follow certain federal regulations regarding the sharing of medical information, there is still plenty of information not subject to those regulations, which may be provided in accordance with embodiments of the present invention.

While the collection of data from reward partners may be extended to as many reward partners as exist in any particular embodiment, in the basic exemplary embodiment of FIG. 3, only steps 320 and 330 relate to the obtaining of data. Alternative embodiments of the present invention appreciate the scalability of the exemplary method, and nothing contained herein should be considered limiting to the number or size of the reward partners.

At step 840, the first and second set of consumer data is aggregated in a database 310. In many embodiments, whereby the database comprises an independent loyalty program 350, the database 310 is hosted on a server, and may be utilized for hosting the independent loyalty program, as well as the system 300 of the embodiments of the present invention. For example, in one embodiment, the database, server and associated software to administer the database are described in detail in U.S. patent application Ser. No. 11/854,387, published on Mar. 6, 2008 as United States Patent Application Publication No. 2008/0059970, the disclosure of which is incorporated herein by reference in its entirety.

At step 850, the first and second sets of consumer data is associated with appropriate consumer records within the database 310 to create an aggregate consumer record. Often, a plurality of consumer records may already exist on the database 310 for any number of consumers 340 from either the independent loyalty program 350 and/or other reward partners' loyalty programs 330 previously existing in the system. In this step 850, the first and second sets of consumer data may be paired with consumer records in the event the records already exist. Any number of data points may be used to match or pair records, for example, using a name and address of a consumer. By utilizing a plurality of data points, the likelihood of false records and error is minimized. However, for purposes of embodiments of the present invention, data may be paired by as few as a single data point.

The resulting pairing generates an enhanced profile of each consumer 340 from a plurality of different sources (i.e., reward partners 320) within each aggregate consumer record. As the system 300 grows, so does probability of growth for the amount of data for any individual aggregate consumer record. In the event no record exists in the database, a new record may be created and subsequently added to when another reward partner 320 also identifies that consumer 340 and provides additional consumer data.

At step 860, the reward partners 320 are given access to the aggregate consumer records. The access for each of the reward partners 320 will be determined by the relationship hierarchy, discussed below and shown in FIG. 10, between the independent loyalty program 350 and the reward partners 320. There may be any number of levels within the relationship hierarchy, for example up to six levels or more, as shown in the exemplary embodiment of FIG. 10, discussed below. The method 800 ends at step 870.

Figure 9:
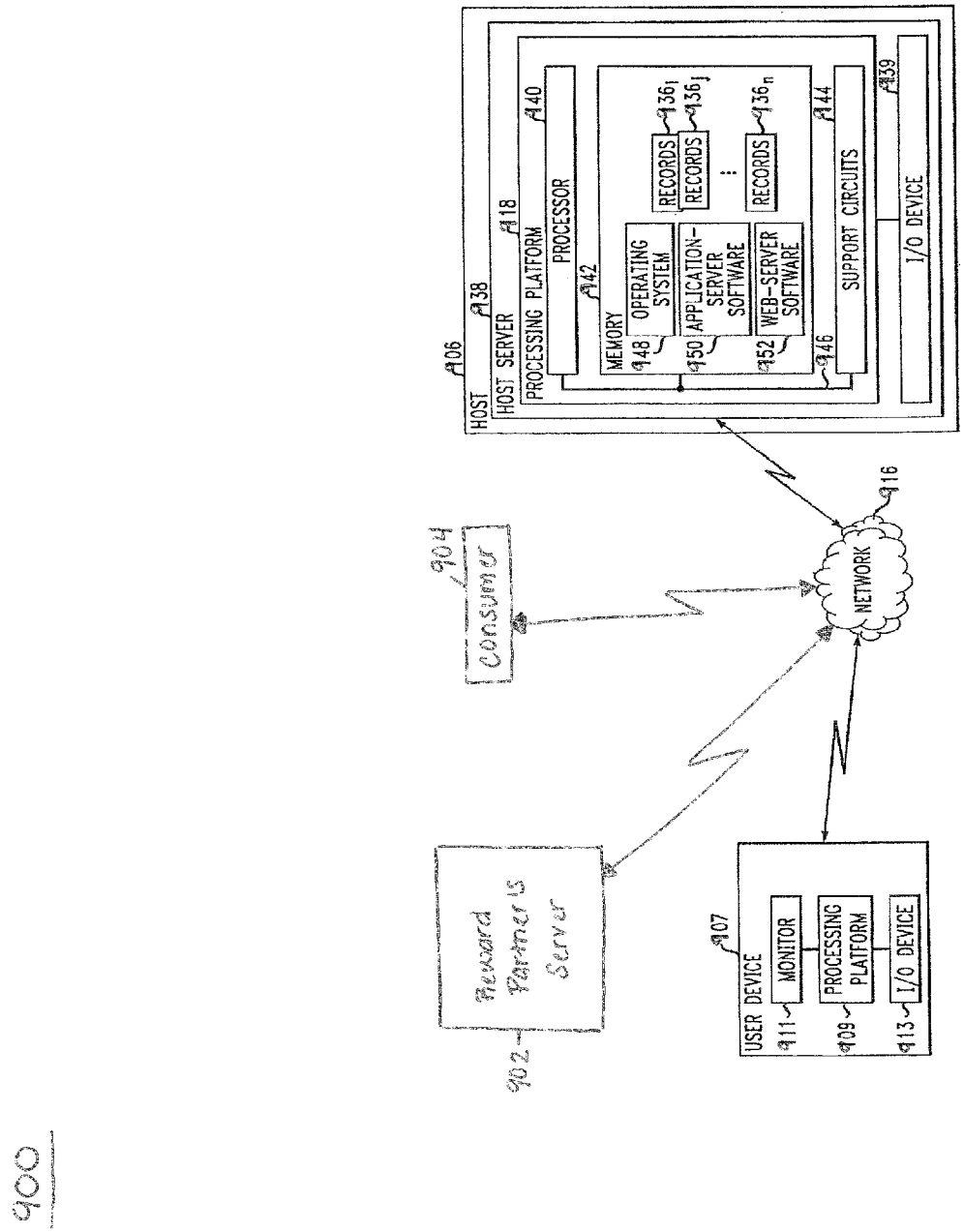
FIG. 9 depicts a block diagram of general network system in accordance with another embodiment of the present invention.

FIG. 9 depicts a block diagram of general network system in accordance with another embodiment of the present invention. Generally, the system 900 comprises a network 910, a reward partner server 902 and a consumer 904.

The reward partner server 902 may store all of the collected consumer data about the consumer 904. As discussed above, consumer data may include, but is not limited to, demographic data, shopping habits, and the like. The reward partner server 902, consumer 904 and host 906 may be communicatively coupled together via a link or network (collectively "network") 916. This way, the reward partner server 902, consumer 904 and host 906 may exchange information via one or more communications carried over the network 916.

The network 916 may be a partial or full deployment of most any communication or computer network or link, including any of, any multiple of, any combination of or any combination of multiples of a public or private, terrestrial wireless or satellite, and wireline networks or links. The network 916 may include, for example, network elements from a Public Switch Telephone Network ("PSTN"), the Internet, core and proprietary public networks, wireless voice and packet-data networks, such as 1G, 2G, 2.5G and 3G telecommunication networks, wireless office telephone systems ("WOTS") and/or wireless local area networks ("WLANs"), including, Bluetooth and/or IEEE 802.11 WLANs, wireless personal area networks ("WPANs"), wireless metropolitan area networks ("WMANs") and the like; and/or communication links, such as Universal Serial Bus ("USB") links; parallel port links, Firewire links, RS-232 links, RS-485 links, Controller-Area Network ("CAN") links, and the like.

The network elements and/or communication links may include circuit switches as well as packet-data elements to provide transport of content, triggers and/or other information; and may be configured to communicate such information using any number of protocols and in any manner consistent with exchanging such information among the reward partner server 902 and host 906. These protocols may include standardized, proprietary, open-source, and freely-available communication protocols for communicating content in circuit-switching and/or packet data networks, and the like.

The host 906 may include one or more servers, including a host server 938. The host server 938 may be deployed in one or more general or specialty purpose computers, personal computers, mainframes, minicomputers, server-type computers and/or any a processor-based platform that operates on any suitable operating system, such as Microsoft® Windows® and/or Linux, that is capable of executing software.

The host server 938 may include a large number of elements, most of which are not shown in FIG. 9 for simplicity of exposition. The elements of host server 938 may be formed in a single unitary device and concentrated on a single server, client, peer or other type node. Alternatively, the elements of the host server 938 may be formed from two or more separate devices, and as such, may be distributed among a number of server, client, peer or other type nodes.

The host server 938 may be deployed in accordance with the scale-up and/or scale-out approaches. Using the scale-up approach, the host server 938 may increase its processing power, amount of memory and number of networkable connections by utilizing a symmetrical, multi-processor architecture so as to provide additional capacity. A benefit of this scale-up approach is that such approach provides for simplified configuration and management as compared to the scale-out approach. Using the scale-out approach, the host server 938 may increase its processing power, amount of memory and number of networkable connections by incrementally adding and/or removing capacity as needed, balancing workload across multiple processors, multiple servers, dedicating specific processors and/or servers for performing specific tasks, using physical or logical servers (e.g., a mult1-N ode cluster approach), etc.

As shown, the host server 938 includes one or more processing units (collectively "processor") 940, memory 942, support circuits 944 and bus 946. The processor 940 may be one or more conventional processors, microprocessors, multi-core processors, microcontrollers, any other processor type feasible in the context of the present invention, any combination thereof, or the like.

The bus 946 provides for transmissions of digital information among the processor 940, memory 942 and support circuits 944 and other (not shown) portions of the host server 938. The support circuits 944 facilitate operation of the processor 940, and may include well-known circuitry or circuits, including, for example, one or more input/output I/O interfaces, one or more NIUs, cache, clock circuits, power supplies, and the like.

The I/O interface provides an interface to control the transmissions of digital information among (shown and not shown) components of host server 938. In addition, the I/O interface provides an interface to control the transmissions of digital information among I/O devices 939 associated with or otherwise attached to the host server 938. The I/O devices 939 may be embodied as any or any combination of (i) storage devices, including but not limited to, a tape drive, a floppy drive, a hard disk drive or a compact disk drive; (ii) a receiver; (ii) a transmitter; (iii) a speaker; (iv) a display; (v) a speech synthesizer; (vi) an output port; (vii) a pointing device, such as a mouse, joystick, trackball, touchpad, pointing stick, light pen, head pointer, soap mouse, eye tracking devices, digitizing tablet and stylus, data glove that translates the user's movements to computer gestures; (vii) a key-in device, such as a keyboard or a touchpad; (viii) and the like.

The NIUs facilitate exchange (e.g., sending and/or receiving) of content. Accordingly, the NIUs may be adapted for communicating over terrestrial wireless, satellite, and/or wireline media.

The memory 942 may be or employ random access memory (RAM), read-only memory (ROM), optical storage, magnetic storage, removable storage, erasable programmable read-only memory and variations thereof, content addressable memory and variations thereof, flash memory, disk drive storage, removable storage, any other storage medium feasible in the context of the present invention, any combination thereof, or the like. The memory 924 may store and/or receive requests from the processor 940 to execute various software packages, such as operating system 948, application-server software 950 and web-server software 952.

Additionally, the memory 942 may store and/or receive requests from the processor 940 to obtain the records $936_i$-$936_n$ (e.g., copies thereof). As above, each of the records $936_i$-$936_n$ may be stored as or in a single file or a plurality of files, and may be structured as text, a table, a database, a distributed hash table, a distributed concurrent object store, a document formed using a markup or markup-like language, or the like, or any combination thereof. The records $936_i$-$936_n$ may be stored, for example, using a Microsoft SQL Server and accessible through an ODBC connection.

Like the records $936_i$-$936_n$, the memory 942 may store and/or receive requests from the processor 940 to obtain operands, operators, dimensional values, configurations, and other data that are used by the various software packages to control the operation of and/or to facilitate performing the functions of the host server 938 and/or the host 906.

The application-server software 950, when executed by the processor 940, is operable to communicate with the reward partner server 902, via the network 916, to obtain the deposited-material record 936; and determine a value associated with the deposited-material measure stored in the deposited-material record 936. In addition, the application-server software 950, when executed by the processor 940, is operable to associate the value to a credit, which may be redeemable by the consumer 904; post the credit to a consumer account; and provide the web-server software 952 with access to the consumer account.

The web-server software 952, when executed by the processor 940, is operable to provide one or more web pages to allow the entity to access the consumer account, and in turn, the credit and other information. For example, web-server software 952 may post the credit on the web pages that are accessible to a consumer 904 via a user device 907, so as to enable the consumer 904 to view details of the account. The details of the account may include the credit (and/or previously accrued credits), debits from the credit (and/or previously accrued credits), detailed history of spending of the credit (and/or previously accrued credits), any orders or vouchers for redeemed credits, any other data or information feasible in the context of the present invention, any combination thereof, or the like.

In addition, the web-server software 952, when executed by the processor 940, is operable to allow the consumer 904, via the user device 907, to redeem the credit. This may include the web-server software 952 providing a portal to retailers to allow the consumer 904 to redeem the credit (and/or previously accrued credits) at the reward partners to obtain goods, services, coupons valued for goods or services, other benefits or discounts, any other goods and/or services feasible in the context of the present invention, any combination thereof, or the like.

The web-server software 952 may also be operable to allow the consumer to transform the credit (and/or previously accrued credits) into one or more vouchers that may be spent at the participating reward partners or donated to some other entity. To facilitate this, the web-server software 952 includes code to allow the entity to (i) order the vouchers for delivery by mail, e-mail or other communication medium; and/or (ii) provide information to the entity via the user device 907 to allow the entity to print or otherwise reduce to physical form, store it on the user device 907 or a peripheral device coupled to the user device 907 (e.g., a PDA, memory device, etc.).

The user device 907 may be, for example, any of or any combination of a personal computer, a portable computer, a handheld computer, a mobile phone, a digital assistant, a personal digital assistant, a cellular phone, a smart phone, a pager, a digital tablet, a laptop computer, an Internet appliance and the like. In general, the system 900 may include a processor-based platform that operates on any suitable operating system, such as Microsoft® Windows®, Linux and/or Symbian, that is capable of executing software.

The user device 907 may, however, include a large number of elements, many of which are not shown in FIG. 9 for simplicity of exposition. The user device 907 includes elements similar to the host 906, except as described hereinbelow. The user device 907 may be formed in a single unitary device and concentrated on a single server, client, peer or other type node. Alternatively, the user device 907 may be formed from one or more separate devices, and as such, may be distributed among a number of server, client, peer or other type nodes. In addition, the user device 907 may be scalable.

As shown, the user device 907 may include a processing platform 909 operable to control, manipulate or otherwise interact with a monitor 911 and/or an I/O device 913, via respective couplings. The processing platform 909, the monitor 911 and the I/O device 913 include elements similar to or the same as the processing platform 918 and the I/O device 939 of the host 906, and as such, the details of such elements are not reproduced here for simplicity of exposition.

The user device 907 is operable to form a user interface through which the entity can access the web pages provided by the web-server software 952. To facilitate this, the user interface may be communicatively coupled with the host server 938 via a network 916. The user interface may be, for example, a graphical-user interface that is operable to execute a web browser application for rendering on the monitor 911 the web pages provided by the web-server software 952. As noted, the consumer 904 may use the user device 907 to access the consumer's account, redeem credits and/or other like functions.

Figure 10:
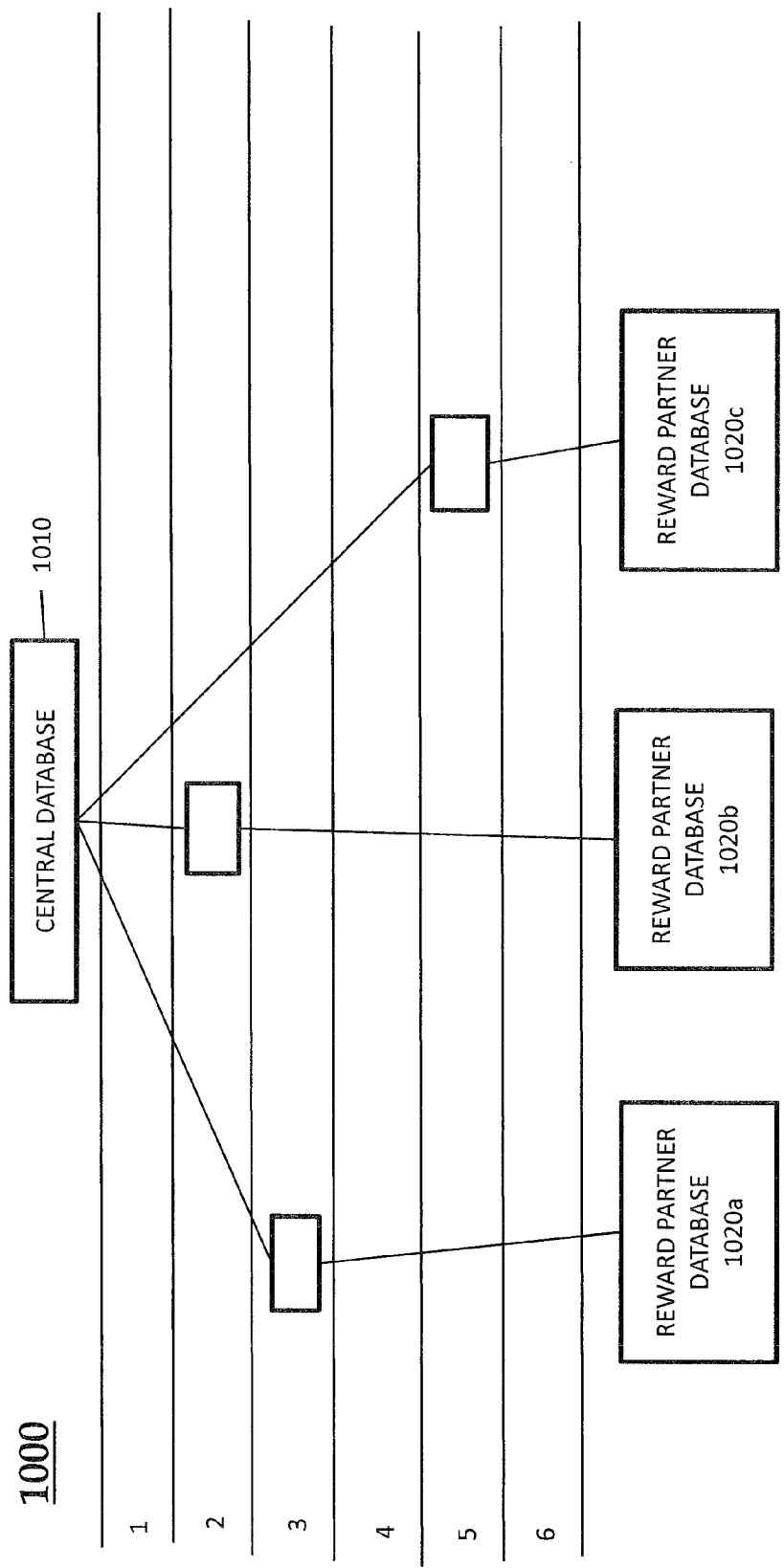
FIG. 10 depicts a block diagram of a general system for a reward partner loyalty program in accordance with yet another embodiment of the present invention.

FIG. 10 depicts a block diagram of a general representation of a cross-integrating consumer loyalty program in accordance with another embodiment of the present invention. Generally, the cross-integrating loyalty program system 1000 comprises at least a database 1010 and a plurality of reward partners 1020*a-c*. The relationship between the database 1010 and the plurality of reward partners 1020*a-c* within the loyalty program system 1000 can be defined by a relationship hierarchy, which as shown, can be divided in to a plurality of sub-levels (e.g., Level 1-Level 6). Fewer or additional levels are also contemplated and within the scope of embodiments of the invention.

In one embodiment, the database 1010 comprises an independent loyalty program. In such an embodiment, the independent loyalty program may comprise a point or value accrual system for consumers participating in some type of activity (e.g., environmentally conscious activities). As a consumer earns points within the accrual system, the consumer may redeem points for a credit or reward. As understood by embodiments of the present invention, the credits or rewards may have monetary value to one or more of merchants or vendors associated with the reward partners 1020*a-c*, e.g., a certain number of points may be redeemed by a consumer for a gift certificate, coupon, or other value-based benefit at a merchant or vendor.

As contemplated by various embodiments of the present invention, the administrator may comprise any database or system management entity described in any of the following U.S. patent application Ser. Nos. 11/345,867, 11/854,387, 12/041,454, 12/041,464, 12/189,217, 12/189,217, 12/189,218, 12/200,527, and 12/354,504, the respective disclosures of which are incorporated herein by reference in their entireties. Each of these applications are co-owned by the Assignee of the present application, RecycleBank LLC, having offices in New York, N.Y. and Philadelphia, Pa., among other locations.

The reward partners 1020*a-c* may comprise any merchant, retailer, vendor, or loyalty program as described in FIGS. 1A-1D above. In some embodiments, each of the reward partners comprise a retail chain (e.g., a chain of grocery stores, pharmacies, etc.). In other embodiments, each of the reward partners comprise a major brand having a diverse product-line or rewards program associated therewith (e.g., Coca-Cola, having mycokerewards). In additional embodiments, each of the reward partners comprise a service-based company having its own unique rewards system (e.g., Travelocity, commercial airliners, etc.). In accordance with many embodiments of the present invention, the reward partners 1020*a-c*, may comprise any combination of the above, or similar alternatives.

The reward partners 1020*a-c* and the central database 1010 may generally be in communication through a network (not shown). Often the network comprises any one of a global computer network, internal network, or the like, yet any suitable electronic communication medium is contemplated.

The level of access granted to each of the reward partners 1020*a-c* is generally regulated by a relationship hierarchy. When forming the loyalty program system 1000, each of the reward partners 1020*a-c* may be designated a particular access level (e.g., Level 1-Level 6) based on any number of factors. For example, the access level may be designated by a value-based exchange (e.g., subscription payment, good/service bartering, etc.), an information-based exchange (e.g., a detailed quantity of consumer information in exchange for a high access level), or the like. While there are six levels of access shown in the exemplary figure, it is understood any number of access levels may exist from a single level to as many as reasonably necessary for various embodiments of the present invention.

As discussed above, in many embodiments, the reward partners 1020*a-c* generally collect a plethora of information regarding consumers. The amount, detail or nature of the information may be as simple or complex as necessary for embodiments of the present invention. In exchange for providing information to the independent loyalty program and database 1010, the reward partners 1020*a-c* will have access to an aggregate consumer record containing information from one or more other reward partners, for a particular consumer. Thus, by utilizing the system 1000 of the present invention, each of the reward partners 1020*a-c* may be able to greatly enhance marketing, targeting, or other data, which its own loyalty program may not be capable of obtaining on its own.

The difference between access Level 1 and Level 6 may be the depth of data accessible to the individual reward partner. If a reward partner only has Level 1 access, that reward partner may only be able to merely view the name and address of the aggregate consumer records within the database. At the next level, i.e., Level 2, the reward partner may be provided the same information, but allowed to search within the database by geographical limitation, or the like. Alternatively, a Level 2 access may provide yet another level of data depth, e.g., the identity of the reward partners having the particular consumer enrolled in their respective loyalty programs. Similarly, as the access level increases, additional information and/or features become available to the reward partners. At Level 6, for example, a reward partner may have full access to the entire complex customer record, including searching and sorting functions normally utilized in a database for compiling data.

As discussed above, the level of access may be granted to each reward partner based on a number of factors. In one embodiment, the reward partners may be required to pay for access levels, data usage, etc. In another embodiment, the reward partners may be required to give a certain amount of data in exchange for certain access. Alternatively, combinations of both or similar exchanges can be utilized for determining a reward partner's access level.

In one exemplary embodiment, by merely being part of the system, all reward partners receive access to some level of basic enhanced data, which may be equal amongst all reward partners. To obtain any access beyond the basic enhanced data, access to additional data may be monetized and made available to the reward partners.

In view of the wide variety of embodiments that can be applied, it should be understood that the illustrated examples are exemplary only, and should not be taken as limiting the scope of the following claims. Further, the claims should not be read as limited to the described order or elements unless stated to that effect.

What is claimed is:

1. A non-transitory computer readable medium for storing instructions that, when executed by a processor, perform operations for cross-integrating consumer loyalty programs, comprising:

establishing a communications link from a host computer to a plurality of reward partners;

receiving a first set of consumer data associated with a first loyalty program, from a first reward partner;

receiving a second set of consumer data associated with a second loyalty program, from a second reward partner, wherein the first reward partner associated with the first loyalty program is distinct from the second reward partner associated with the second loyalty program, and wherein the first reward program is distinct from the second reward program;

aggregating the first set of consumer data and the second set of consumer data in a database;

creating an aggregated consumer profile in response to the aggregation of the first set of consumer data and the second set of consumer data;

determining different access levels to the aggregated consumer profile for the first reward partner and the second reward partner, based on hierarchical access levels determined by at least one of subscription payment, good/service bartering, and detailed quantity of consumer information received from each reward partner; and providing hierarchical access to the aggregated consumer profile according to the determined hierarchical access level for each reward partner.

2. The non-transitory computer readable medium of claim 1, wherein the aggregating of the first set and second set of consumer data in the database further comprises matching a pair of profiles within the consumer data.

3. The non-transitory computer readable medium of claim 1, wherein the first and the second reward partners further comprise at least one of a merchant, a retailer, a vendor, or a retail chain.

4. The non-transitory computer readable medium of claim 1, wherein the consumer data further comprises at least one of consumer demographic data or consumer shopping habits.

5. A computer-implemented method for cross-integrating consumer loyalty programs comprising:

establishing a communications link from a host computer to a plurality of reward partners;

receiving a first set of consumer data associated with a first loyalty program, from a first reward partner;

receiving a second set of consumer data associated with a second loyalty program, from a second reward partner, wherein the first reward partner associated with the first loyalty program is distinct from the second reward partner associated with the second loyalty program, and wherein the first reward program is distinct from the second reward program;

aggregating the first set of consumer data and the second set of consumer data in a database of the host computer;

creating, by the host computer, an aggregated consumer profile in response to the aggregation of the first set of consumer data and the second set of consumer data;

determining, by the host computer, different access levels to the aggregated consumer profile for the first reward partner and the second reward partner, based on hierarchical access levels determined by at least one of subscription payment, good/service bartering, and detailed quantity of consumer information received from each reward partner; and providing, by the host computer, hierarchical access to the aggregated consumer profile according to the determined hierarchical access level for each reward partner.

6. The method of claim 5, further comprising:
establishing a communications link from the host computer to the plurality of reward partners; and
establishing the hierarchical access level, having tiers of consumer data to be shared by different reward partners, dependent upon each reward partner's access level.

7. The method of claim 5, wherein the aggregating of the first set and second set of consumer data in the database of the host computer further comprises matching a pair of profiles within the consumer data.

8. The method of claim 5, wherein the first and the second reward partners further comprise at least one of a merchant, a retailer, a vendor, or a retail chain.

9. The method of claim 5, wherein the consumer data further comprises at least one of consumer demographic data and consumer shopping habits.

10. A system for cross-integrating consumer loyalty programs comprising:

a processor, accessible via a global computer network, and a memory in communication with the processor, the memory storing instructions, when executed by the processor, will result in:

establishing a communications link from a host computer to a plurality of reward partners;

receiving a first set of consumer data associated with a first loyalty program, from a first reward partner;

receiving a second set of consumer data associated with a second loyalty program, from a second reward partner, wherein the first reward partner associated with the first loyalty program is distinct from the second reward partner associated with the second loyalty program, and wherein the first reward program is distinct from the second reward program;

aggregating the first set of consumer data and the second set of consumer data in a database of the host computer;

creating, by the host computer, an aggregated consumer profile in response to the aggregation of the first set of consumer data and the second set of consumer data;

determining, by the host computer, different access levels to the aggregated consumer profile for the first reward partner and the second reward partner, based on hierarchical access levels determined by at least one of subscription payment, good/service bartering, and detailed quantity of consumer information received from each reward partner; and providing, by the host computer, hierarchical access to the aggregated consumer profile according to the determined hierarchical access level for each reward partner.

11. The system of claim 10, wherein the aggregating of the first set and second set of consumer data in the database further comprises matching a pair of profiles within the consumer data.

12. The system of claim 10, wherein the first and the second reward partners further comprises at least one of a merchant, a retailer, a vendor, or a retail chain.

13. The system of claim 10, wherein the consumer data further comprises at least one of consumer demographic data or consumer shopping habits.

* * * * *